United States Patent [19]

Davis

[11] 4,295,263
[45] Oct. 20, 1981

[54] CIRCULAR INSULATION SAW SYSTEM

[76] Inventor: Harry C. Davis, 8993 Airline Hwy., Baton Rouge, La. 70815

[21] Appl. No.: 63,743

[22] Filed: Aug. 6, 1979

[51] Int. Cl.³ .................. B23D 57/00; B23D 3/02
[52] U.S. Cl. ........................... 29/561; 29/564; 83/607; 83/875; 408/54
[58] Field of Search .............. 29/561, 557; 408/54, 408/69; 83/601, 875, 610, 597, 662, 761, 635

[56] References Cited

U.S. PATENT DOCUMENTS

| 740,727 | 10/1903 | Wissman | 408/54 |
|---|---|---|---|
| 2,751,941 | 6/1956 | Smith | 408/54 X |
| 2,780,896 | 2/1957 | Jaye | 408/54 X |
| 2,841,193 | 7/1958 | Petrofsky | 408/54 X |
| 2,983,175 | 5/1961 | Harris | 83/635 |
| 3,060,779 | 10/1962 | Taft | 83/607 |
| 3,312,131 | 4/1967 | Gilmore | 29/557 X |
| 3,941,018 | 3/1976 | Williams | 83/875 |
| 4,059,035 | 11/1977 | Davis | 83/761 X |
| 4,140,036 | 2/1979 | Davis | 83/662 X |

FOREIGN PATENT DOCUMENTS

844230 8/1980 United Kingdom ............... 83/875

Primary Examiner—William R. Briggs
Attorney, Agent, or Firm—Charles C. Garvey, Jr.; Thomas S. Keaty

[57] ABSTRACT

A machine for cutting insulation material into semi-circular blocks. Circular cutting blades are mounted reciprocally on a support shaft. A router functions to cut a groove in the insulation material to provide clearance for the cutting blade support shaft.

13 Claims, 14 Drawing Figures

CIRCULAR INSULATION SAW SYSTEM

BACKGROUND OF THE INVENTION

1. Field of the Invention

The present invention relates to insulation cutting devices, and more particularly relates to an improved rotary type insulation cutter. Even more particularly, the present invention provides a rotary insulation cutting device having an improved cutter and router assembly which cooperate to form semi-circular insulation members for use with pipe. Even more particularly, the present invention provides an improved reciprocal rotary insulation cutting system having an improved feed system for conveying insulation blocks to be cut to the rotary cutter assembly.

2. General Background and Prior Art

In the industrial piping field, it is often required that individual runs of pipe be insulated to either preserve their heated or cooled condition, or to prevent injury to persons working near the pipes from burn and the like. The industry has developed a foam glass type insulation which is commercially available in usually block form and is known in the art, and is widely used commercially. The foam blocks are usually uniform in shape being generally rectangular and available from a number of commercial sources.

Figures 7, 8, 9:
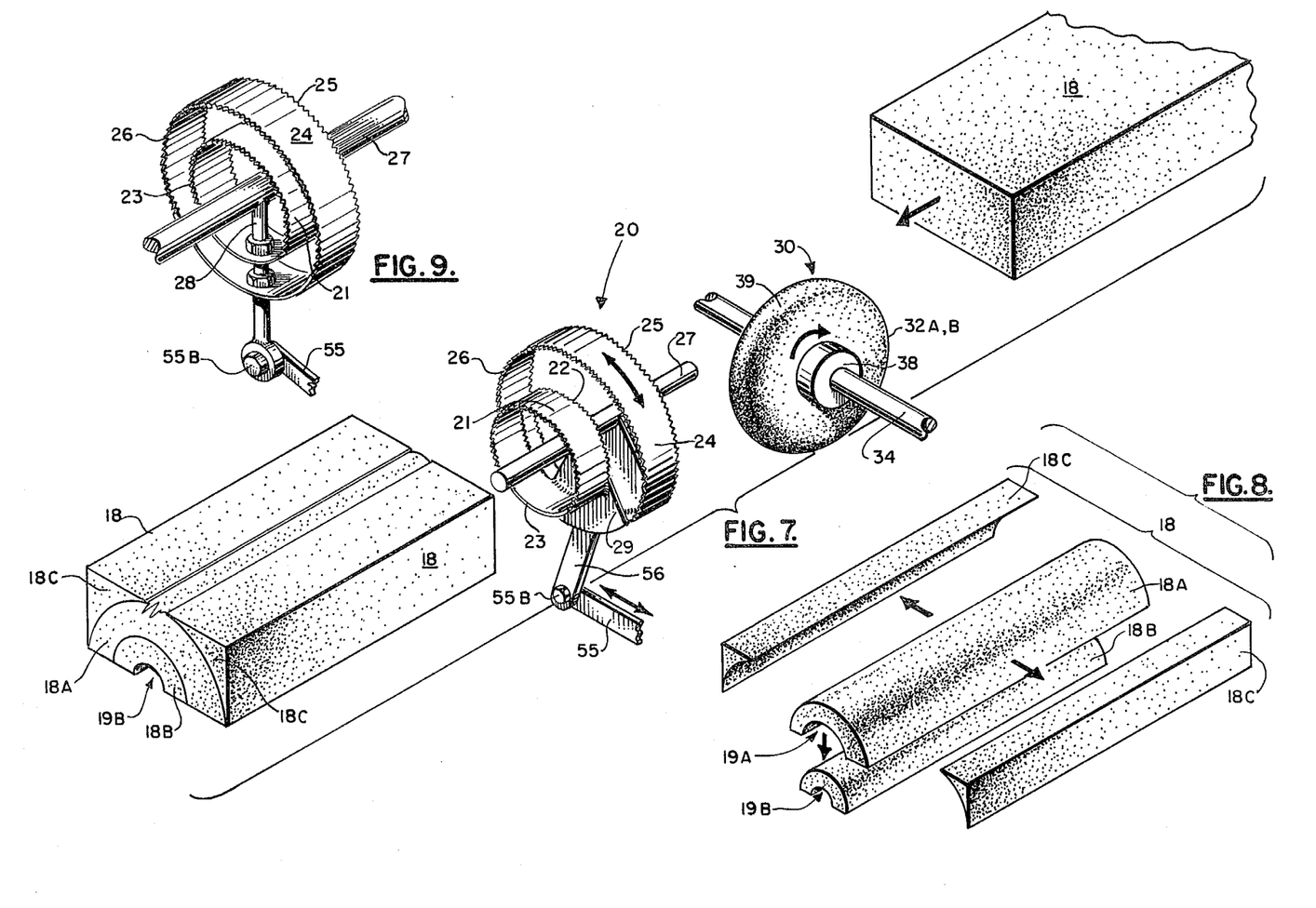
FIG. 7 is a partial perspective view of the preferred embodiment of the apparatus of the present invention illustrating cutting blade and router portions thereof.
FIG. 8 is a perspective view of an insulation block material member after being cut by the preferred embodiment of the apparatus of the present invention.
FIG. 9 is a partial perspective view of an alternate embodiment cutter assembly, as shown in FIG. 7.

Since fluid conveying members are generally circular, such as conventional piping, a need exists for a cutting apparatus which can transform the rectangular block of foam glass members into semi-circular insulation members (see FIG. 8 in the drawings). The cutting of foam blocks into semi-circular or curved insulation members require a safe apparatus having means for feeding the blocks to the saw or cutting portion in a safe manner minimizing the chance for injury.

Many prior art type devices which do utilize a circular cutting member or cutting assembly do not have the cutting assembly firmly braced so that a true and precise cut is made.

Prior art type devices often do not provide a means for pushing the foam insulation blocks to and through the blade without the proximate placement of human hands. Devices without such material feed systems are hazardous for the worker who is employed to operate the device.

The block of insulation material to be cut normally experiences a high degree of stress when the cutting operation begins. Thus, there is a need for a suitable bracing assembly which can support the block of material on all sides yet allow for irregularities in blocks as they are fed to the saw or cutting assembly.

Since a number of blocks of insulation material would normally be cut in a given day on a given device, there is a need to provide a feed mechanism or a feed system which is fully automatic, thus being precise and accurate in cutting each successive block in the same shape.

A further need exists for a dual feed type feed system which supplies one block to be cut to the saw while the operator is busy removing and/or packaging the previously cut block of insulation material which now provides the desirable semi-circular insulation members adapted to fit for example heated or cooled pipe lines or piping systems.

Many prior art type devices are available which perform the cutting task in transforming rectangular blocks of foam glass material into generally semicircular insulation members which can be affixed to circular pipe structures. Some of these prior art type devices utilize a mandrel and elongated band saw type cutting arrangements. Such devices require skilled operators to properly mount the foam glass blocks on the mandrel and thereafter oversee the turning of the foam glass block on the mandrel and its cutting by a blade structure. Further, many types of mandrel and blade arrangements provide a plurality of blades to cut a plurality of semi-circular insulation members from a single foam glass block, see for example U.S. Pat. Nos. 4,059,035 and 4,140,036.

Rotary type saws are also known. Prior art type rotary saws are provided which generally attack the problem of cutting the foam glass block by providing a circular blade shaped to conform to the O.D. of the pipe to which the insulation member will thereafter be fitted. U.S. Pat. No. 3,060,779 issued to P. M. Taft and entitled "Cutting Apparatus" provides such a rotary type saw for cutting block type insulation material suitable for covering pipe, tanks, cylinders, tubes, and other circular type structure. The Taft device utilizes a plurality of circular blades, which are reciprocally driven from a linkage and belt member. Several blades are provided for cutting a number of insulation members from a single block of material.

In U.S. Pat. No. 2,841,193 issued to P. E. Petrofsky, there is provided a machine for sawing sponge like cellular glass. In that patent, a circular blade is reciprocally driven from a belt drive motor with a pair of circular blades performing the cutting. The device also teaches the cutting of elbow members, as shown in FIGS. 6-9.

In U.S. Pat. No. 2,751,941 issued to E. S. Smith, and entitled "Tubular Power Saw", a rotary saw blade is supported by roller bearings, which are motor driven. The saw is truly rotary rather than reciprocal as the above mentioned references.

In U.S. Pat. No. 2,983,175 issued to B. B. Harris, and entitled "Foam Glass Shaping Device", the device provides circular blades which are vibrated with the vibration being translated to the blade in order to cut the rigid but brittle foam glass material.

U.S. Pat. No. 3,312,131 provides another insulation forming device. The patent is issued to G. T. Gilmore and entitled "Insulation Forming Device", and provides a circular saw mounted on roller bearings which support the saw blade itself.

U.S. Pat. No. 2,780,896 issued to R. C. Jaye and entitled "Apparatus for Cutting Pipe Cover Sections from Cellular Material" provides a rotary cutting blade which is supported by rollers and belt driven with a motor. Recesses are provided in the cutting blade to accommodate the belt. The device suffers in that the blade must be thick enough to accommodate the thickness of the drive belt. Thus greater friction and excessive material cut thickness is required.

Prior art devices usually support the cutting assembly or blade itself at the periphery thereof usually by roller bearings or a pivoting arm. These and other prior art devices suffer in that they do not provide a true cut of the insulation foam glass material, especially of the inner recess portion of the smallest cut, which must fit closely to small diameter pipe.

These and other prior art devices suffer in that they do not provide a true cut of the insulation foam glass material, especially of the inner recess portion of the smallest cut, which must fit closely to small diameter pipe.

These prior art devices provide generally for a manual type feed which is hazardous to the operator in that the blades can often generate a tremendous amount of force applied directly to the block which must be held during the cutting operation.

Prior art type devices are generally a one direction feed, requiring a pause in the cutting operation while the operator removes the cut insulation members before he can reinsert an uncut block to be cut by the machine.

3. General Description of the Present Invention

The present invention provides an insulation material cutting assembly comprising a frame with a material feed surface being supported by the frame. The frame provides fore and aft material feed surface areas, with a circular cutting blade movably mounted on the feed surface and providing fore and aft cutting edges. The circular cutting saw can be placed generally between the fore and aft material feed surface. A router in the form of preferably one or two routing wheels is movably on the table for routing a semi-circular groove in a block of insulation material to be cut, preferably as the insulation block travels from the fore or aft material feed surface to the circular cutting blades.

A dual direction automatic feed associated with the feed table can feed a block of insulation material to be cut from the fore or from the aft material feed surface area along fore and aft feed lines respectively to the cutting blade. Each router wheel is mounted generally below the feed table with a semicircular portion projecting above adapted to rout a semi-circular groove in a block of insulation material which travels along at least a portion of the fore or the aft feed path.

In the preferred embodiment, a circular cutting saw provides a pair of circular blades which are mounted reciprocally on a supportive shaft at the feed table surface which shaft is rotatably supported by the feed table fore and aft of an opening in the table through which the circular blades project.

The router provides a routing surface which projects above the feed surface an area at least as great as the shaft upon which the circular cutting blades are mounted. In operation an insulation block to be cut will first be fed across one of the router wheels before engaging the circular cutting blades. The innermost recess will be cut in the block before it reaches the saw, with the recess passing through the cutting assembly at the shaft portion thereof. No binding of insulation material with the saw will be seen as with prior art devices, since the router pre-cuts a recess to accommodate the cutting assembly shaft before the block enters the cutting assembly.

Therefore, it is an object of the present invention to provide an improved circular cutting apparatus which allows cutting of an insulation block of material in two directions. Further, it is an object of the present invention to provide an automatic feed system which can feed insulation blocks to be cut to the rotary blade in one of two directions, allowing the operator to be unloading one piece of material while the other piece of material is being cut.

It is another object of the present invention to provide a more positive cutting assembly which utilizes a cutting router in cooperation with a shaft mounted circular rotary cutting blade, with the router first cutting a groove recess in the material block before the block engages the cutting assembly, with the recess passing the area occupied by the cutting assembly shaft.

It is another object of the present invention to provide an insulation material cutting apparatus which is simple and easy to manufacture and maintain.

It is another object of the present invention to provide an insulation material cutter having a bracing system which grasps the block of insulation material to be cut during the cutting operation when cutting stresses are applied directly to the block.

It is another object of the present invention to provide a guide system for guiding the insulation material block to be cut to the router and cutting assemblies, and therethrough.

It is another object of the present invention to provide a feed mechanism which feeds the block of insulation material to be cut to the router, to the cutting assembly, and therethrough, with continual feed until the insulation block of material clears the blade structure after cutting.

It is another object of the present invention to provide a dual direction material feed and associated switching system with an insulation cutting apparatus which shuts off the material feed when a single block of material has been fed through the cutting blade assembly and the desired cut made.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 2:
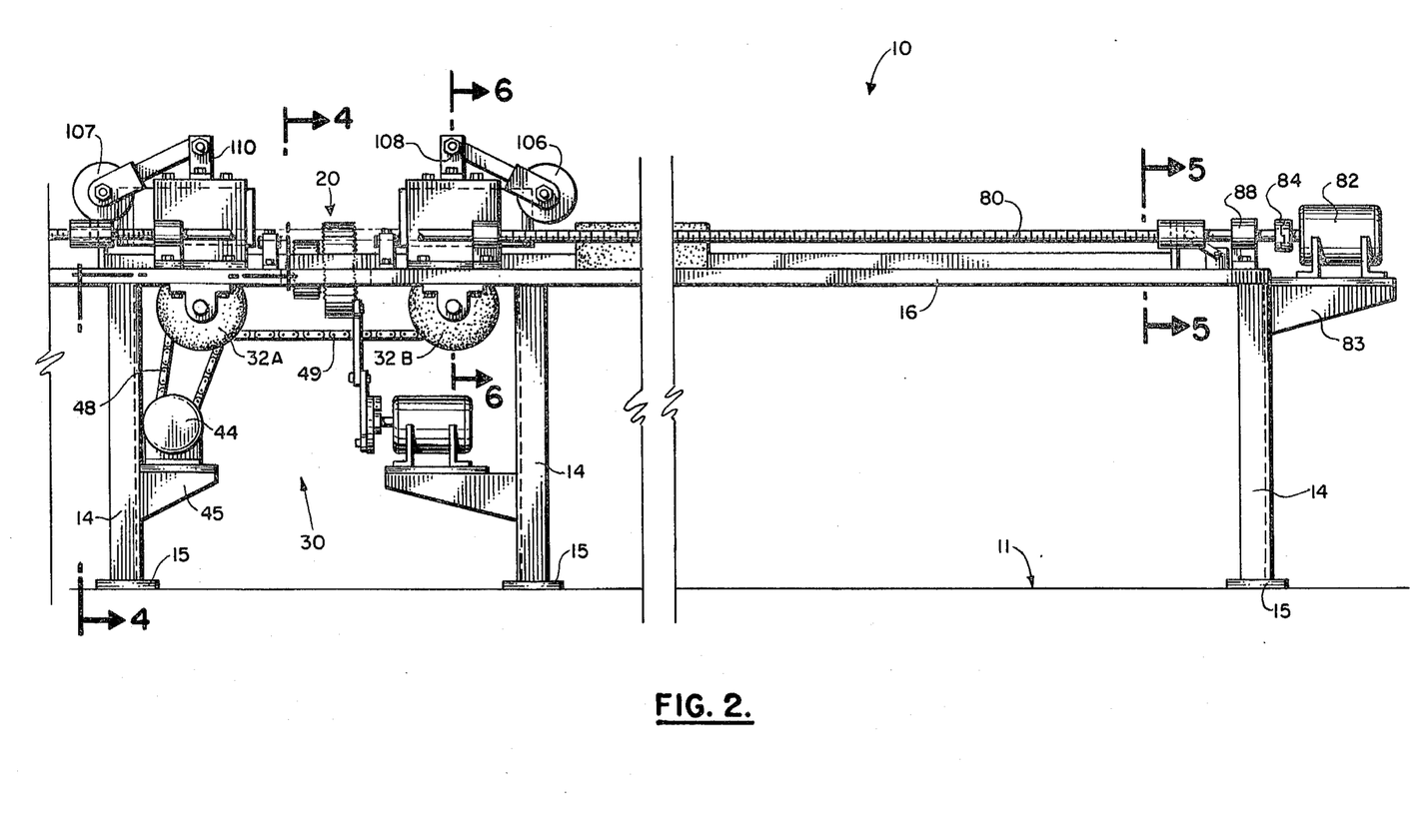
FIG. 2 is a side view of the preferred embodiment of the apparatus of the present invention.
Figure 3:
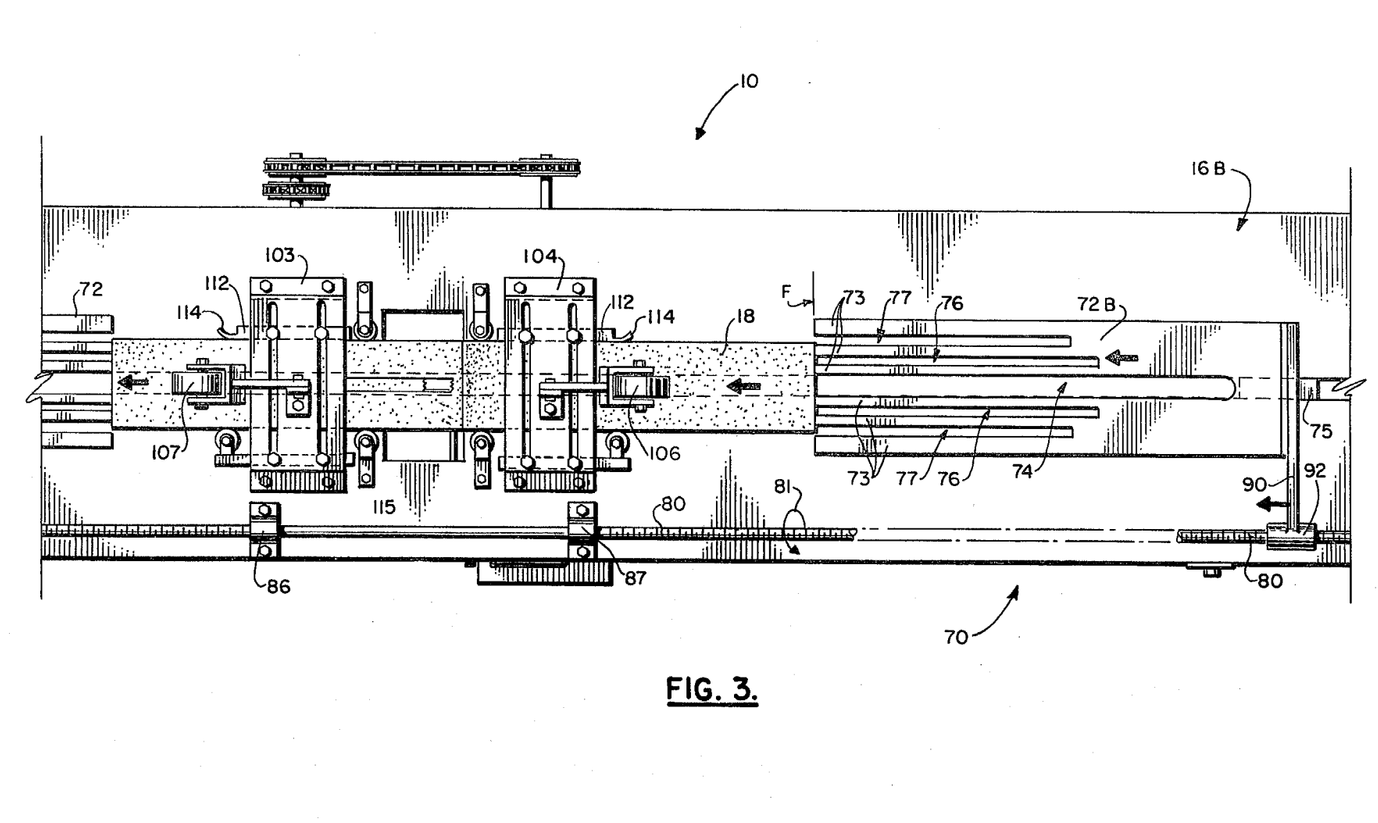
FIG. 3 is a plan view of the preferred embodiment of the apparatus of the present invention.
Figure 4:
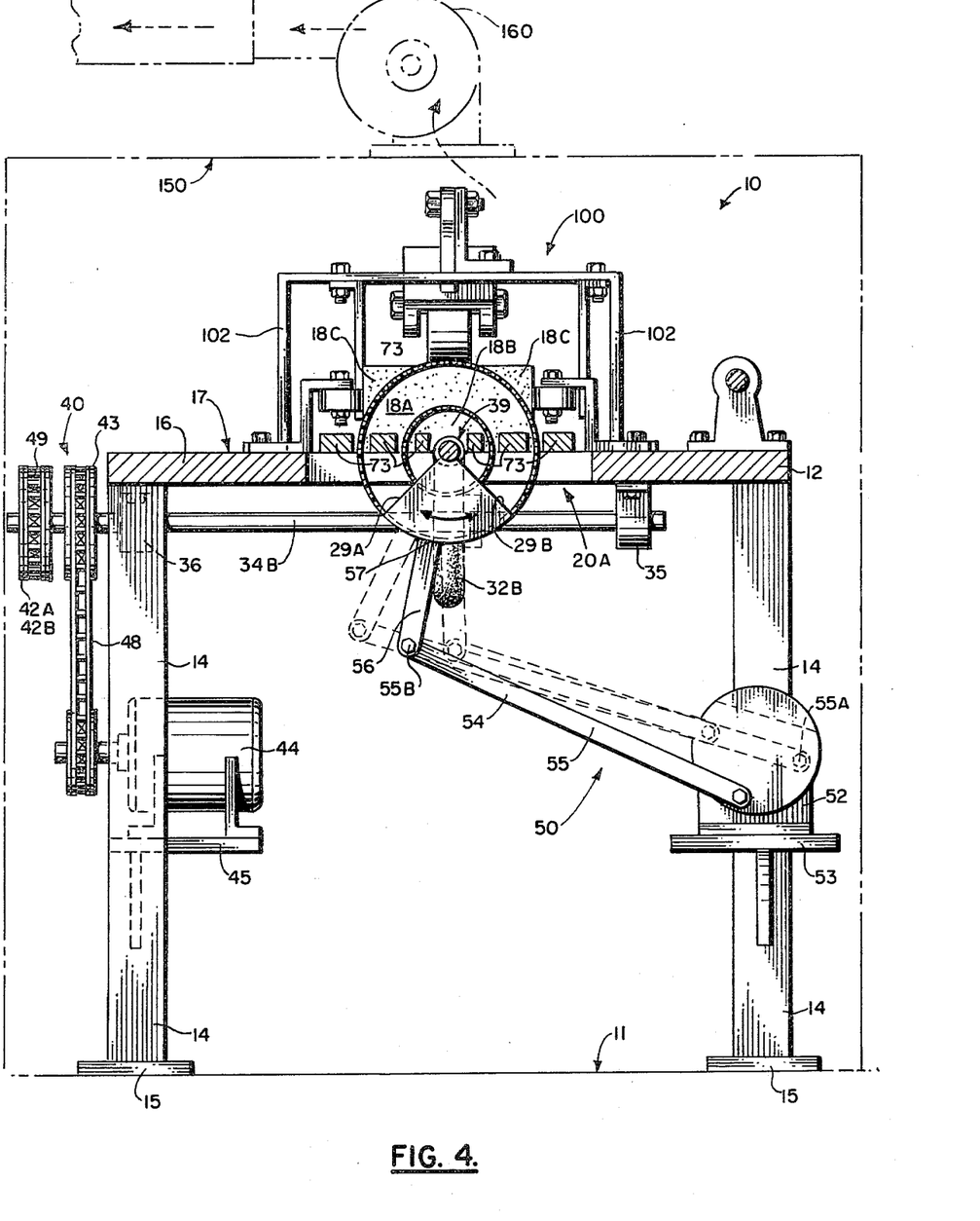
FIG. 4 is a sectional view taken along lines 4—4 of FIG. 2.
Figure 5:
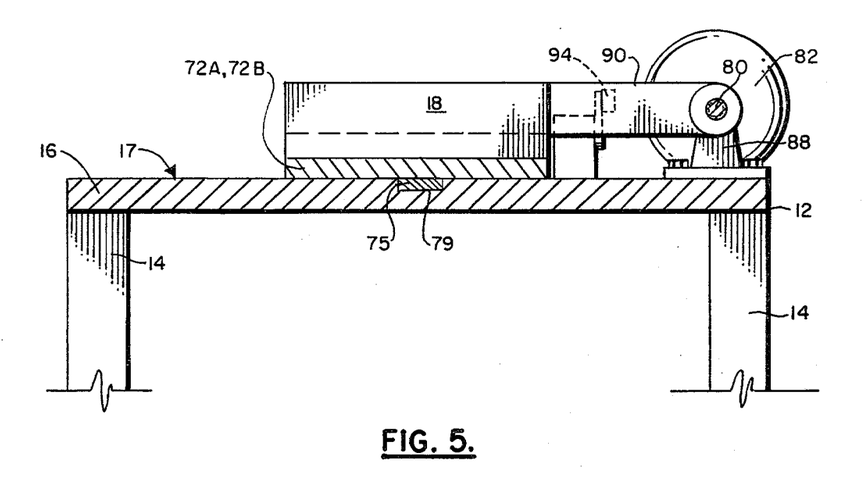
FIG. 5 is a sectional view taken along lines 5—5 of FIG. 2.

FIGS. 2–4 illustrate best the preferred embodiment of the apparatus of the present invention designated generally by the numeral 10. Saw apparatus 10 is adapted to be placed on a suitable floor or ground 11 for use in a shop or the like. Saw apparatus 10 comprises generally a supportive frame 12, having an upper feed table 16 supported by legs 14 and having material feed surface 17 thereon. A circular cutting assembly 20 is provided which can be movably mounted on cutter shaft 27 as will be described more fully hereinafter. In the preferred embodiment, cutter assembly 20 is adapted for a reciprocal movement on shaft 27 mounted on table 16 at recess.

A router assembly 30 provides preferably a pair of router wheels 32a, 32b which are movably mounted on feed table 16.

Numeral 70 indicates generally the feed system portion of the preferred embodiment of the present invention. Feed system 70 is preferably automatic and preferably dual direction, as will be described more fully hereinafter.

Frame 12 is comprised generally of an upper feed table 16 having a plurality of supportive legs 14 with lower feet 15, which abut the ground or floor surface 11. Feed table 16 provides an upper table surface 17 upon which blocks 18 of foam glass insulation material or the like, can be fed to cutter assembly 20.

Cutter assembly 20 provides blades 21, 24 which are generally circular in shape. Each blade 21, 24 provides fore and aft cutting edges, with cutting edges 22, 23 being provided on inner blade 21 and fore and aft cutting edges 25, 26 provided for on outer blade 24. Blades 21, 24 are affixed to a cutter shaft 27 by means of V support 29. V support 29 provides a pair of V support arms 29a, 29b which attach from shaft 27 outwardly to blades 21, 24 (see FIG. 4).

Router assembly 30 comprises a pair of router wheels 32a, 32b which are rotatably mounted upon router shafts 34a, 34b. Each shaft 34a, 34b is mounted on shaft bearings 35, 36 for rotation. Bushing 38a, 38b provides attachment for each router wheel 32a, 32b to its corresponding shaft 34a, 34b. Each shaft 34a, 34b is provided with a sprocket 42a, 42b, which sprockets are connected by means of drive chain 48. One of shafts 34a, 34b provides a drive sprocket 43 which is adapted to engage drive chain 48 and motor sprocket 46. Motor 44 which can be attached to frame 12 at leg 14 on bracket 45 provides rotary energy for the driving of sprocket 46, chain 48, sprockets 42a, 42b, and sprocket 43. It would be appreciated by one skilled in the art that drive power provided by drive motor 44 will power sprockets 42a, 42b, 43, and will likewise power drive chains 48 and sprocket chain 49. Thus, both router wheels 32a, 32b which are rigidly affixed to their respective shafts will be rotatably driven by router drive motor 44.

In the preferred embodiment, router wheels 32a, 32b are generally circular in shape providing a semi-circular projecting portion 39 as best seen in FIG. 4 above the surface 17 of feed table 16. Note that projecting portion 39 of router wheels 32a, 32b is larger in diameter than shaft 27. Material fed to blades 21, 24 will already preferably be precut with a semi-circular groove of a size equal to or greater than shaft 27. Thus, material fed to cutting assembly 20 will not bind or cause excessive drag and improper cut/alignment in that the space occupied by shaft 27 will already be precut by router assembly 30.

In FIG. 4, numeral 50 indicates generally a drive system for cutter assembly 20. A cutter drive motor 52 mounted on support bracket 53, which can be welded for example to legs 14 of frame 12, drives through linkage 54 reciprocally cutter assembly 20. Cutter linkage 54 provides a motor link arm 55 and a cutter link arm 56. Cutter arm 56 is attached at 55a to motor 52. 56b represents a pivotal or rotary attachment of motor arm 55 to cutter arm 56. 57 indicates a rigid and, for example welded attachment, of cutter arm 56 to outer blade 24. It will be appreciated that blades 21, 24 will be reciprocally moved in each direction (see arrows, FIG. 4) which moves the support arms 29a, 29b up to and flush with work surface 17 but not above. Thus, the support arms 29a, 29b will be freely movable and will not interfer with the foam block 18 or its feed system 70.

Alternatively, a cutter assembly 20 can be provided as shown in FIG. 9 having shaft 27 with a single support arm 28 being provided which can be attached by bolting, for example, as is shown in the drawing.

In FIG. 7–9 there can be seen a conventional block 18 of insulation material which is fed (see arrow) towards router assembly 30 and cutter assembly 20.

Further, there can be seen a first 18a, larger insulation member and a second 18b, smaller insulation member, which are semi-circular in shape and adapted for attachment to a pipe or other circular member to be insulated. Also seen are waste cuttings 18c, which represent the waste material from a typical block 18 of insulation material which will be cut as aforementioned.

Recesses 19a, 19b are provided in each semicircular insulation member 18a, 18b with recess 19b being formed by the exposed projected portion 39 of router assembly 30 as aforedescribed with respect to FIG. 4. Recess 19b will provide a space for shaft 27 as block 18 moves through cutting assembly 20 during the cutting operation.

Figure 1A:
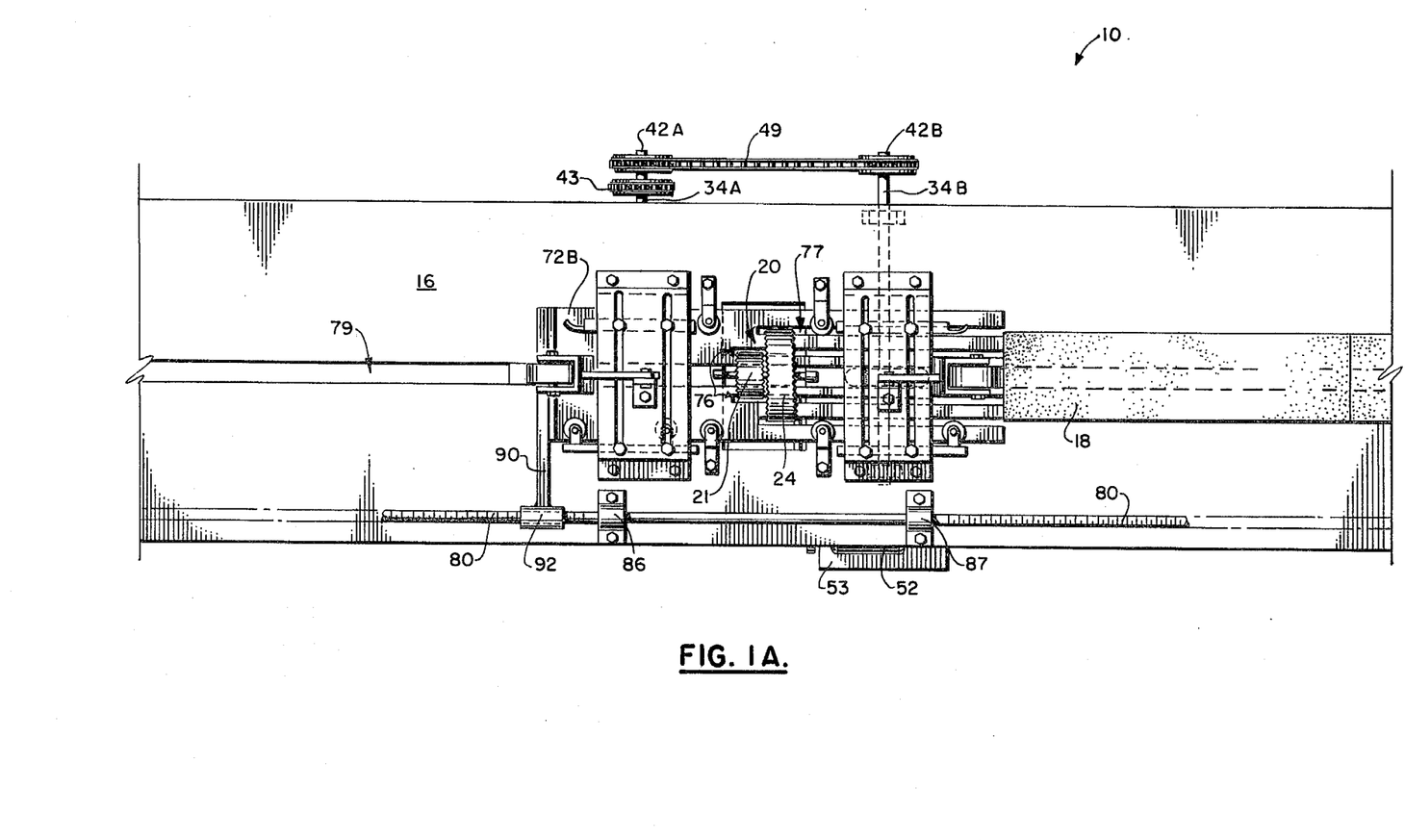
FIGS. 1a–1c provide plan views of the preferred embodiment of the apparatus of the present invention.
Figure 1B:
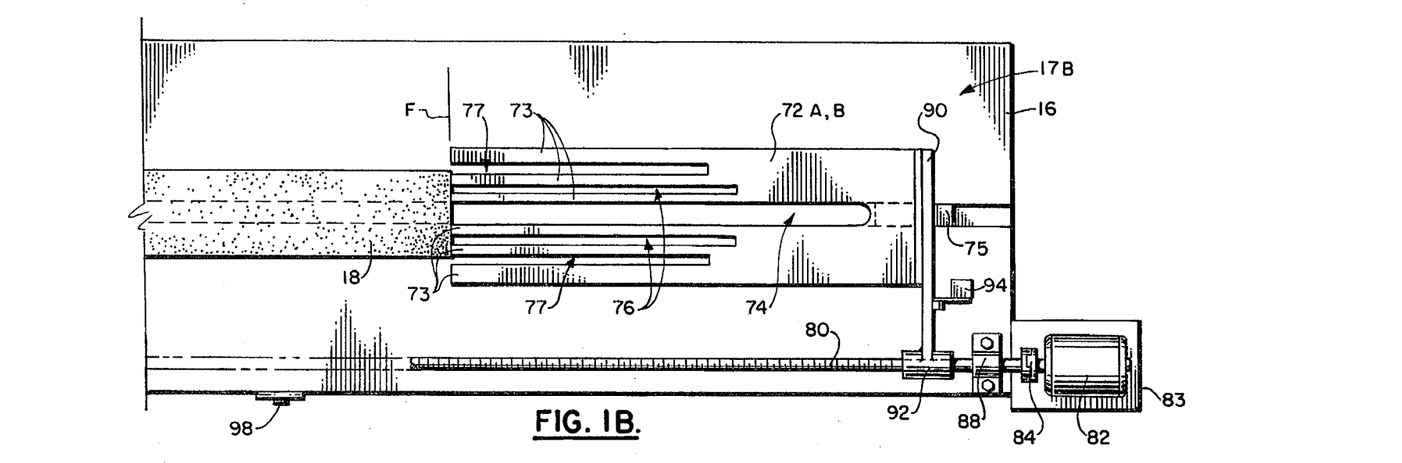
Figure 1C:
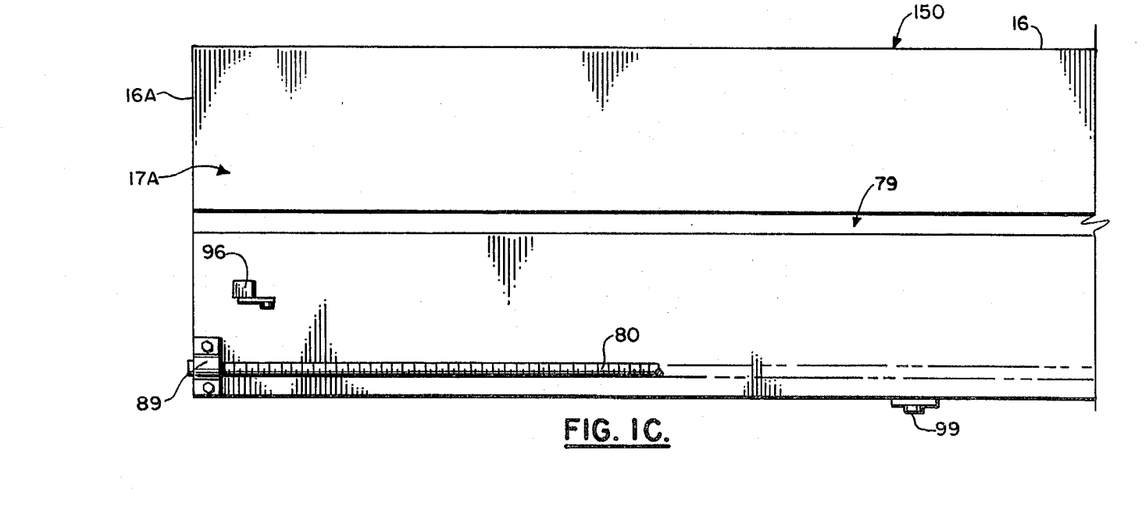

FIGS. 1–3 provide a detailed view of the feed system 70 portion of the preferred embodiment of the apparatus of the present invention. Feed system 70 provides a means for feeding automatically or manually foam blocks 18 along table 16 at surface 17 to cutter assembly 20 where blocks 18 are formed in semi-circular fashion (see FIG. 8).

Feed system 70 is comprised generally of a pair of pusher assemblies 72a, 72b, mounted for movement on a threaded feed shaft 80, and a feed motor assembly 82.

Pusher assemblies 72a, 72b are best seen by inspecting FIG. 3. Pusher 72b is shown in FIG. 3 which provides a substantially rectangular flattened member having a plurality of fingers 73 with recesses 74, 76, 77, spacing fingers 73 as best seen in FIG. 3. As will be described more fully hereinafter, a central recess 74 is provided allowing pusher 72b to move through cutter assembly 20 without hitting yet allowing pusher fingers 73 to advance block 18 into and through cutter assembly 20 as is desirable. Central recess 74 is provided to miss shaft 27, while recess 76 is provided to allow blade 21 to pass within pusher 72b and past leading edge 75 thereof. Likewise, a large blade recess 77 is provided which allows larger blade 24 portion of cutter assembly 22 advance into pusher 72b and beyond leading edge 75. As aforementioned, with pusher 72b so designed it can advance by the urging of pusher arm 90 (as will be described more fully hereinafter) towards cutter assembly 20 pushing a block 18 of material into contact with cutter assembly 20. In FIG. 1a, cutter assembly 20 is shown in a position with pusher 72b having advanced therethrough, pushing a block 18. It can be seen that pusher assemblies 72a, 72b can easily move a block 18 of insulation material to and through cutter assembly 20 as is desirable to complete a cutting of insulation block 18 into the desired curved insulation members.

Pusher assemblies 72a, 72b are advanced by pusher arm 90 which are affixed at arm attachment 92 to threaded shaft 80. Shaft 80 is an elongated preferably threaded shaft, which engages with corresponding female threads provided on the inner surface of arm attachment 92. A plurality of support bearings 86, 87, 88, 89 support shaft 80 in a rotary fashion.

Shaft 80 receives rotary motion from feed system drive motor 82, which is mounted by motor bracket 83 to frame 12 at legs 14 (see FIG. 2). A suitable motor-shaft coupling 84 is provided which allows motor 82 to rotatably drive shaft 80. Shaft 80 would only have uniform threads along its length and as rotated would move pusher arm 90 either towards or away from cutter assembly 20 depending upon the rotation of motor 82 and the direction of corresponding rotation in shaft 80. Note that in operation, pusher 72a, 72b abuts at leading edge 75 block 18. Each pusher assembly 72a, 72b would be preferably rectangular and have some thickness at least at leading edge 75, which would allow it to abut and push against block 18.

Pusher arms 90 normally advance each pusher assembly 72a, 72b. Pusher arms 90 could be integrally attached to pusher assembly 72a, 72b or could be affixed temporarily by bolting or like means. It would be understood by one skilled in the art that movement fore and aft by pusher arms 90 would produce a corresponding fore and aft movement in the corresponding pusher assembly 72a, 72b.

In FIG. 1a–3, the fore end portion of table 16 is designated generally by the numeral 16b while the aft portion thereof is designated generally by the numeral 16a. Likewise, the fore surface portion of table 16 is designated by the numeral 17b while the aft portion is designated by the numeral 17a.

Fore and aft limit switches 94, 96 are provided. Each limit switch stops the fore or aft travel of pusher arm 90 and its attached pusher assembly 72a, 72b. Fore and aft override start buttons 98, 99 are also provided which are wired to override the left limit switch to start the left to right motion after the limit switch has stopped motion of the aft pusher assembly 72a as aforedescribed. In a like manner, fore override start button 98 overrides right limit switch 98 to start right to left motion of pusher assembly 72b when such motion has been stopped by limit switch 94.

A guide 75 can be provided on each pusher assembly 72a, 72b which cooperates with a corresponding recess 79a provided down the central portion of table 16 at surface 17. It would be appreciated that recess 79 will define an axis line down the approximate center portion of table 16 at surface 17 intersecting shaft 27. FIG. 4 illustrates this arrangement showing the center of shaft 27. Blocks 18 will generally follow this axis as will the projecting portion 39 of router wheels 32a, 32b.

FIGS. 1a and 2–6 illustrate the material brace assembly 100 portion of the preferred embodiment of the apparatus of the present invention. Brace assembly 100 is comprised generally of a supportive frame 102 which can be generally rectangular in configuration (see FIGS. 3–4). Frame 102 would be of a suitable structure material such as steel or aluminum, and would be bolted, welded, or the like to table 16 at surface 17. In FIG. 4, brace frame 102 is bolted to table 16. Brace frame 102 can be generally two part, corresponding to the two router wheels 32a, 32b as will be best seen in FIG. 2. Each sub frame 103, 104 provides an upper guide wheel 106, 107 having support brackets 108, 110 respectively, which can be for example bolted to sub frames 103, 104.

Figure 6:
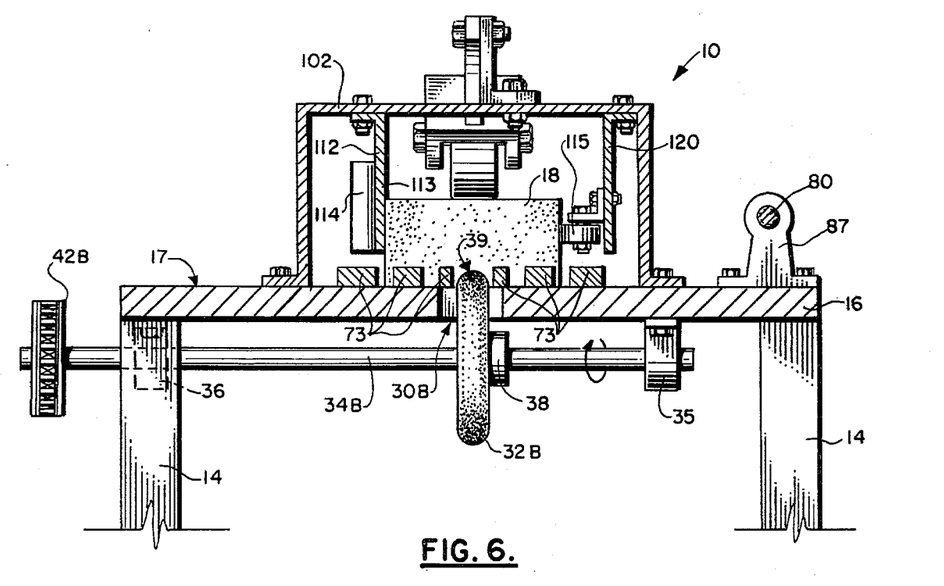
FIG. 6 is a sectional view taken along lines 6—6 of FIG. 2.

An inspection of FIG. 6 will shown an end view of material base assembly 100. There can also be seen guide bar 112 which provides a generally flat portion 113 against which block 18 can register and slide against when being moved towards router wheels 32a, 32b and cutter assembly 20. Note opposite guide 112 that a plurality of side rollers 115 are provided. Each side roller 115 has a support arm 120, which can be bolted for example to brace frame 102 or table 16. In the preferred embodiment as will best be seen by inspecting FIG. 3, ten guide rollers 115 are provided. A view of FIG. 3 will also show adjustment slots 125 in the upper most portion of frame 102 which provide a lateral adjustment to guide 112 and side rollers 115. Note that each guide 112 is further provided with an outwardly curved portion 114, which corrects for any misalignment of block 18 as it proceeds under the urging of pusher assemblies 72a, 72b towards cutter assembly 20.

From the above, it can be seen that block 18 would be supported on its side, its bottom as well as its top to prevent any motion away from cutter 16 during the feeding/cutting operation. Cutter 16 will be reciprocated as above described, as block 18 passes therethrough under the urging of feed system 70. During this feeding, material brace assembly 100, as above described, will properly and positively secure block 18 in proper position to give a precise cut each time.

Figure 10:
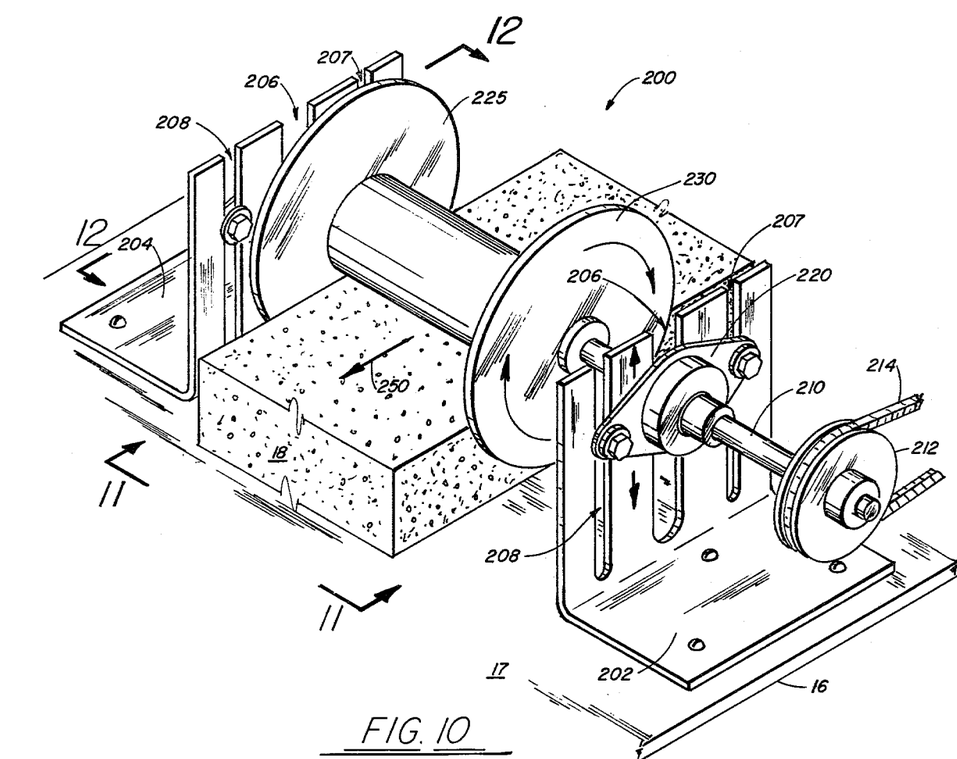
FIG. 10 is a perspective view of an alternative embodiment of the block feed system of the present invention.
Figure 11:
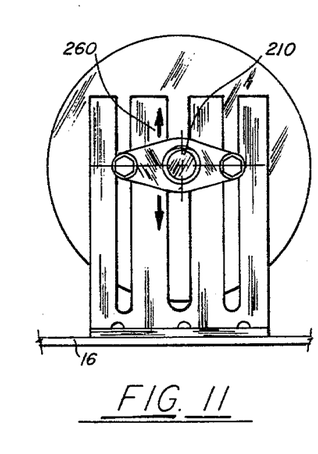
FIG. 11 is a side view thereof.
Figure 12:
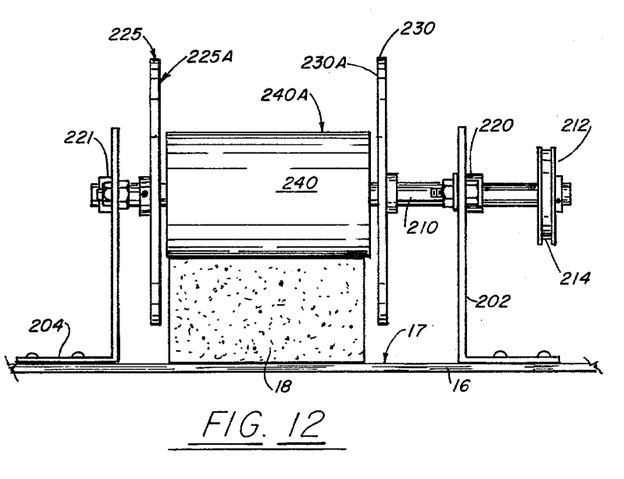
FIG. 12 is a front view thereof.

FIGS. 10–12 illustrate a feed system 200 which is an alternative system for feeding blocks 18 to cutting assembly 20. In FIG. 10 there can be seen a pair of support brackets 202, 204 which can be affixed by bolting or like means to table 16 at surface 17.

Adjustably supported by each bracket 202, 204 is a shaft 210 having bearings 220, 221 at brackets 202, 204 respectively. Each bracket 202, 204 provides adjustment slots, 206–208 which allow vertical adjustment of shaft 210 with respect to table 16 surface 17. Shaft 210 is provided at one end portion for example with a suitable rotary drive such as pulley 212 powered by belt 214. At the inside portions of shaft 210 are a pair of guide wheels 225, 230 each having inner surfaces 225a, 230a as best seen in FIG. 12. Guide wheels 225, 230 provide lateral support to block 18 as it is powered toward cutting assembly 20 in the direction generally shown by arrow 250 in FIG. 10. At the central portion of shaft 210 is roller 240 having surface 230a. Roller 240 would preferably be of a pliable material such as foam rubber or the like and would "give" somewhat during operation thus providing a slight downward bearing force upon block 18 as desired.

It would be appreciated by one skilled in the art that adjustment as shown by the arrows 260 in FIG. 11 would allow more or less pressure to be applied to the upper surface of block 18 pressing it against table surface 17 as disired. Guide wheels 225, 230 could be adjusted laterally along shaft 210 as desired to provide close or spaced abuttment against the sides of block 18. In the preferred embodiment, shaft 210 would be rotated at a speed of approximately 5 to 10 revolutions per minute or at a suitable speed which would move block 18 forward and through cutting assembly 20 at a speed of on the order of one inch per second. It would be appreciated that faster speeds could be supplied by increasing the diameter of roller 240 or increasing the speed of pulley 212. Speed could be increased or decreased depending on the cutting ability of assembly 20.

The entire saw apparatus 10 could be encapsulated in a dust guard container housing to prevent the escape of foam glass particles and dust into the environment where it might be inhaled by human workers or operators. Doors or flaps could be provided to allow access to remove blocks which were cut, and activate the switches as needed. A vacuum source could be provided to such an outer casing or housing for removal of dust, thus providing a health and safety addition to the above described device. In the preferred embodiment, such a housing is indicated schematically by the numeral 150 and would have side walls adjacent the outer edge of table 16, and would have a height above the top of brace frame 102 and a depth to the floor 11. In FIG. 4 housing 150 is schematically represented by phantom lines. 160 generally designates use of a vacuum pump to remove dust and other shavings which might be collected within the housing.

Saw apparatus 10 could be manufactured of any suitable structural material such as aluminum, steel, or the like. Motors as above indicated are conventional electrical motors, for example. Housing 150 could be manufactured of any suitable preferably clear material, such as glass or plexiglass.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A circular insulation saw apparatus for cutting blocks of insulation material into pipe insulation members comprising:
   a. a frame with a material feed surface having first and second end portions and being supported by the frame, there being further provided a saw mount opening in said feed surface;
   b. a powered circular cutting blade movably mounted with respect to said feed surface at the said opening;
   c. a shaft spanning said opening and attaching at the end portions thereof to said material feed surface of said frame;
   d. at least one strut member attaching said blade to said shaft, said shaft occupying a position at the center of said circular cutting blade;
   e. router means on said feed surface between said first end portion and said cutting blade for pre-cutting a generally semi-circular groove in a block of insulation material to be cut responsive to movement of the block of insulation material from said first to said second end portion with the semi-circular groove cut by said router means thereafter registering with said shaft during the subsequent cutting of the insulation block by said blade.

2. The circular insulation saw apparatus of claim 1, wherein there is further provided fore and aft feed stations on said material feed surface and dual direction feed means for feeding blocks of insulation material to be cut from said fore or said aft feed station to said cutting assembly and said cutting assembly is provided with fore and aft cutting blades adapted to cut a block of insulation material fed to said cutting means from said fore or from aft feed station.

3. The circular insulation saw apparatus of claim 1, further comprising automatic feed means for automatically moving a block of insulation material to be cut from said fore or from said aft feed surface to said cutting assembly.

4. The apparatus of claim 3 further comprising brace frame means associated with said table for supporting a block of insulation material to be cut during the cutting thereof on at least the top portion thereof, said brace frame means providing at least one wheel movably mounted on said frame means and adjustably movable with respect to said table.

5. A circular insulation saw apparatus comprising:
   a frame;
   b. a table providing a feed surface thereon having first and second end portions and being supported by said frame;
   c. a blade opening in said table;
   d. a shaft mounted on said table at said opening and spanning a portion of said opening with said shaft attaching to said table at the end portions thereof;
   e. at least one circular cutting blade mounted to said shaft, with said shaft defining a center of rotation of said cutting blade;
   f. router means associated with said table and being movably mounted at said surface between said first end portion thereof and said blade opening for routing a groove in a block of insulation material to be cut responsive to movement of the block of insulation material on said surface from said first end portion to said second end portion;
   g. power means for reciprocally moving said circular cutting blade on said shaft.

6. The circular insulation saw apparatus of claim 1, wherein said strut member provides a V-shaped strut member attaching at separate positions on said cutting assembly and at generally the same position on said shaft.

7. The circular insulation saw apparatus of claim 1, wherein said strut comprises a single member attached to said shaft and generally perpendicular thereto and extends radially therefrom to said cutting assembly, being attached to said cutting assembly at a portion thereof.

8. The circular insulation saw apparatus of claim 5, wherein said power means comprises a motor and linkage means connecting said motor to said shaft for reciprocally moving said blade on said shaft.

9. The circular insulation saw apparatus of claim 5, further comprising block feed means on said table for moving insulation blocks to be cut along said table and to said cutting blade.

10. The apparatus of claim 9, wherein said block feed means comprises at least one powered roller mounted on said table and adapted to engage at least one surface of the block of insulation material to be fed to said blade.

11. The apparatus of claim 10, wherein said feed means comprises:
    i. a pair of brackets having a space therebetween;
    ii. a shaft attached at its end portions to said brackets;
    iii. a pair of guide wheels mounted on said shaft adjacent said bracket and space apart to receive a block of insulation material therebetween; and
    iv. a roller having a diameter smaller than the diameter of said guide wheels mounted on said shaft therebetween, said roller being spaced above said table surface to allow the passage of a block of insulation material thereunder.

12. The apparatus of claim 11, wherein said shaft is adjustably attached to said pair of brackets allowing vertical adjustment of said shaft with respect to said table surface.

13. The apparatus of claim 12, wherein said roller is at least in part a pliable material which gives when an insulation block of material passes under said roller and on said feed surface.

* * * * *